US009335783B2

(12) United States Patent
Van Olst et al.

(10) Patent No.: US 9,335,783 B2
(45) Date of Patent: May 10, 2016

(54) CONTROLLER SHIFTING DEVICE

(71) Applicant: KARMA MEDICAL PRODUCTS CO., LTD., Minsyong Township, Chiayi County (TW)

(72) Inventors: Eric Van Olst, Denekamp (NL); Chih-Chuan Yang, Minsyong Township, Chiayi County (TW); Cheng-Jy Tien, Minsyong Township, Chiayi County (TW)

(73) Assignee: Karma Medical Products Co., Ltd., Minsyong (TW)

(*) Notice: Subject to any disclaimer, the term of this patent is extended or adjusted under 35 U.S.C. 154(b) by 51 days.

(21) Appl. No.: 14/537,275

(22) Filed: Nov. 10, 2014

(65) Prior Publication Data

US 2015/0128751 A1 May 14, 2015

(30) Foreign Application Priority Data

Nov. 11, 2013 (TW) ............................. 102221061 U

(51) Int. Cl.

| | |
|---|---|
| ***B60N 2/46*** | (2006.01) |
| ***G05G 1/62*** | (2008.04) |
| ***A61G 5/04*** | (2013.01) |
| ***A61G 5/10*** | (2006.01) |
| ***G05G 1/00*** | (2006.01) |
| ***G05G 9/00*** | (2006.01) |
| *A61G 5/12* | (2006.01) |

(52) U.S. Cl.

CPC .. *G05G 1/62* (2013.01); *A61G 5/04* (2013.01); *A61G 5/10* (2013.01); *G05G 1/00* (2013.01); *G05G 9/00* (2013.01); *A61G 2005/1094* (2013.01); *A61G 2005/125* (2013.01); *A61G 2203/14* (2013.01); *Y10T 74/20396* (2015.01)

(58) Field of Classification Search

CPC . G05G 1/62; G05G 1/00; G05G 2009/04703; A61G 5/04; A61G 2203/14; A61G 2005/1051; A61G 2005/125

USPC ................. 297/411.3, 411.2, 411.31, 411.38, 297/411.37; 248/585, 282.1; 180/65.1; 280/304.1

See application file for complete search history.

(56) References Cited

U.S. PATENT DOCUMENTS

| | | | | |
|---|---|---|---|---|
| 4,234,150 A * | 11/1980 | Mee | B25J 9/1065 | 248/281.11 |
| 5,188,423 A * | 2/1993 | Meiller | B60N 2/46 | 297/411.38 |
| 5,326,063 A * | 7/1994 | Stevens | A61G 5/04 | 248/282.1 |
| 5,558,404 A * | 9/1996 | Muzzy | B60N 2/4626 | 297/411.38 |
| 6,688,571 B1 * | 2/2004 | Pauls | A61G 5/04 | 248/282.1 |
| 7,222,826 B1 * | 5/2007 | Berglund | A47B 21/0314 | 248/118 |
| 7,427,078 B1 * | 9/2008 | Humble | A61G 5/10 | 248/276.1 |
| 8,684,398 B1 * | 4/2014 | Nyitray | A61G 5/10 | 280/250.1 |

(Continued)

FOREIGN PATENT DOCUMENTS

| | | | |
|---|---|---|---|
| KR | 101310840 B1 * | 9/2013 | |
| SE | WO 9203774 A1 * | 3/1992 | G05G 1/62 |

*Primary Examiner* — Laurie K Cranmer

(74) *Attorney, Agent, or Firm* — Nixon & Vanderhye P.C.

(57) ABSTRACT

A controller shifting device for interconnecting an armrest and a controller of a powered wheelchair includes an adjustment mechanism. The adjustment mechanism includes a casing, a first connection seat connected to the casing for connection with the armrest, and a second connection seat connected to the casing for installation of the controller. When the casing rotates from an operating position to a folded position, the second connection seat is lowered for placing the controller below the armrest.

9 Claims, 5 Drawing Sheets

(56) References Cited

U.S. PATENT DOCUMENTS

2004/0085295 A1* 5/2004 Cowen .................... A61G 5/04 345/161

2007/0074917 A1* 4/2007 Jaenke .................... A61G 5/10 180/65.1

2008/0066974 A1* 3/2008 Pearlman ............... A61G 5/043 180/22

* cited by examiner

CONTROLLER SHIFTING DEVICE

CROSS-REFERENCE TO RELATED APPLICATION

This application claims priority of Taiwanese Application No. 102221061, filed on Nov. 11, 2013.

FIELD OF THE DISCLOSURE

The disclosure relates to a shifting device, and more particularly to a controller shifting device for a powered wheelchair.

BACKGROUND OF THE DISCLOSURE

Powered wheelchairs are primary transportation tools for disabled persons. In order to conveniently control a powered wheelchair, a controller is mounted to an armrest of the powered wheelchair, and includes a standing operating lever for direction and speed control. In general, the controller is placed in front of the armrest such that a user can lay his/her arm on the armrest when controlling the standing operating lever. To prevent inadvertent operation of the controller from causing an accident when use of the controller is not needed, the controller is made to be rearward pivotable so as to be placed beside the armrest. However, the current controller is limited to horizontal rearward and forward shifting relative to the armrest. As such, the standing operating lever still protrudes from the armrest when the controller is pivotably disposed beside the armrest. As a result, inadvertent operation of the controller may still occur due to careless touch by the user's arm.

SUMMARY OF THE DISCLOSURE

Therefore, an object of the present disclosure is to provide a controller shifting device that can alleviate at least one of the aforesaid drawbacks of the prior art.

According to the present disclosure, a controller shifting device for interconnecting an armrest and a controller of a powered wheelchair includes an adjustment mechanism including a casing, a first connection seat and a second connection seat.

The first connection seat is adapted to be secured to a bottom side of the armrest.

The casing has two opposite first and second end portions and is connected pivotally to the first connection seat in an inclined manner relative to the armrest.

The second connection seat is connected to the second end portion for installation of the controller.

In operation, the first connection seat has a first shaft that extends upward relative to the casing from the first end portion and a first mount body that is secured to and extends upwardly and obliquely relative to said casing from the first shaft for connection with the armrest. The casing is rotatable about the first shaft together with the second connection seat between an operating position where the second connection seat is situated in front of the armrest, and a folded position where the second connection seat is situated at one side of the armrest. One of the first and second end portions extends upward and forward relative to the armrest when the casing is in the operating position or in the folded position.

When the casing revolves rearward from the operating position to the folded position, the casing extends downward and rearward relative to the armrest from the first end portion to the second end portion to descend a top end of the second connection seat to a level lower than a top end of the first mount body, thereby placing the controller below the arm rest.

BRIEF DESCRIPTION OF THE DRAWINGS

Other features and advantages of the present disclosure will become apparent in the following detailed description of the embodiment with reference to the accompanying drawings, of which.

DETAILED DESCRIPTION OF THE EMBODIMENT

Figure 1:
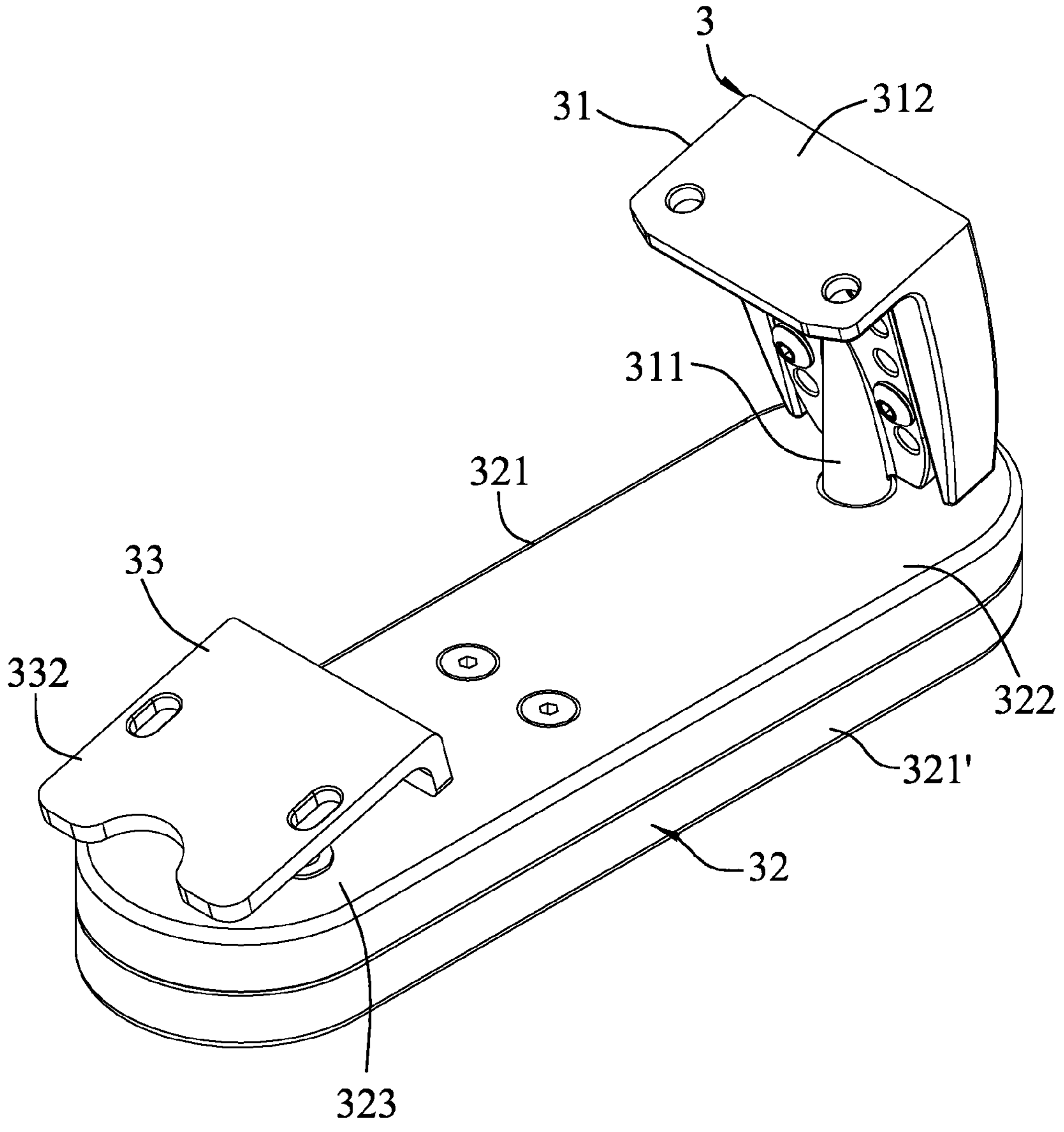
FIG. 1 is a perspective view illustrating an embodiment of a controller shifting device according to the present disclosure.
Figure 4:
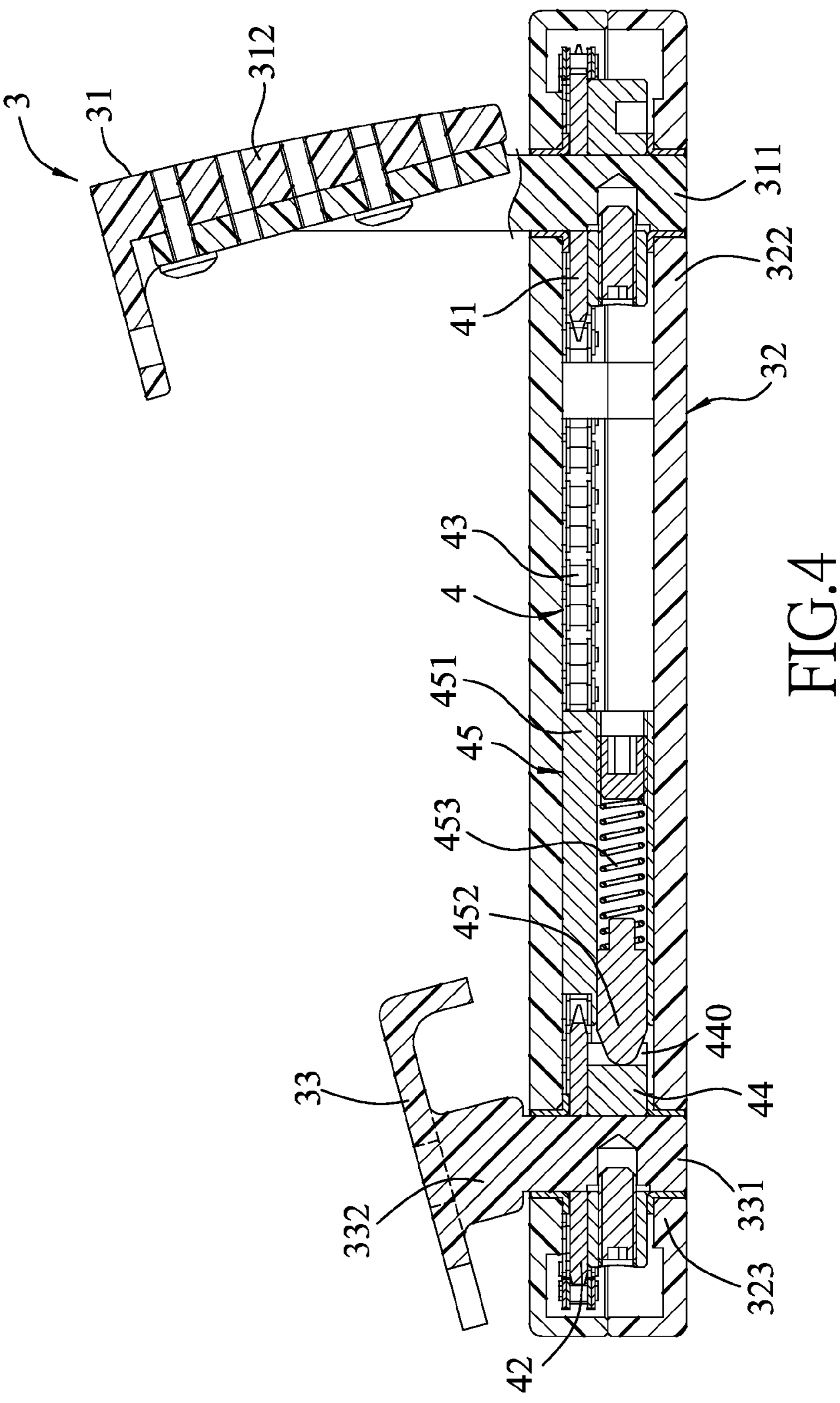
FIG. 4 is a sectional view illustrating the embodiment.
Figure 5:
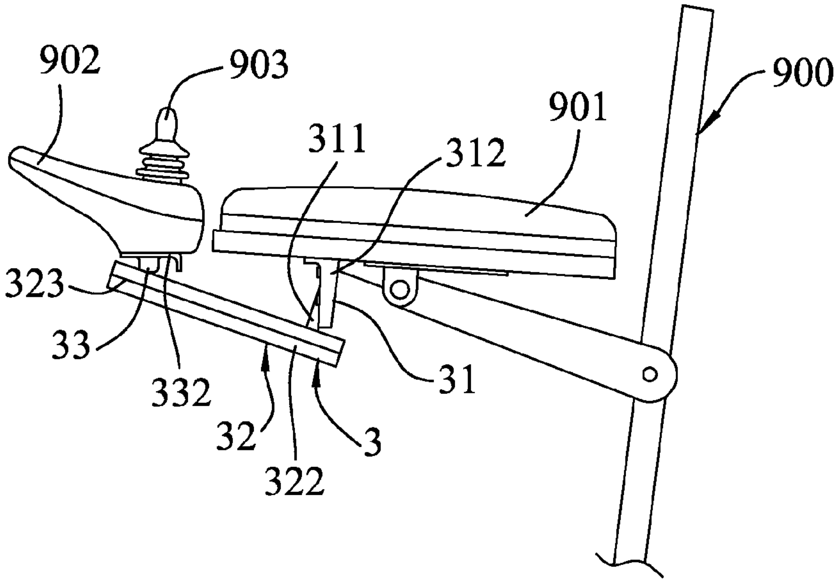
FIG. 5 is a fragmentary schematic side view illustrating the embodiment connected to a powered wheelchair when the casing is in an operating position.

Referring to FIGS. 1, 4 and 5, an embodiment of a controller shifting device according to the present disclosure is suited for interconnecting an armrest 901 and a controller 902 of a powered wheelchair 900. The armrest 901 is disposed in a substantially horizontal manner and extends lengthwise in a front-rear direction of the wheelchair 900. The controller 902 has an operating lever 903 that generally extends in a top-down direction relative to the wheelchair 900 when in a normal state for user control of the powered wheelchair 900.

The controller shifting device includes an adjustment mechanism 3 and a transmission mechanism 4. In this disclosure, the adjustment mechanism 3 includes a first connection seat 31 that is adapted to be secured to a bottom side of the armrest 901, a casing 32 that has two opposite first and second end portions 322, 323 and that is connected pivotally to the first connection seat 31 in an inclined manner relative to the armrest 901, and a second connection seat 33 that is connected to the second end portion 323 for installation of the controller 902. In addition, the casing 32 is composed of upper and lower covers 321, 321'. The upper and lower covers 321, 321' cooperatively define the first and second end portions 322, 323 of the casing 32.

In this embodiment, the first connection seat 31 has a first shaft 311 that extends upward relative to the casing 32 from the first end portion 322, and a first mount body 312 that is secured to and extends upwardly and obliquely relative to the casing 32 from the first shaft 311 and that has a top surface for connection with the bottom side of the armrest 901. The second connection seat 33 has a second shaft 331 that extends upward relative to the casing 32 from the second end portion 323 of the casing 32 and that is substantially parallel with the first shaft 311, and a second mount body 332 that is secured to the second shaft 331 for installation of the controller 902 on top thereof. Specifically, the second mount body 332 extends upwardly and obliquely relative to the casing 32 from the second shaft 331. The first shaft 311 is substantially perpendicular to the first end portion 322.

In this embodiment, after the adjustment mechanism 3 is installed on the armrest 901 and the controller 902 is to be operated by the user (see FIG. 5), the casing 32 is inclined relative to the armrest 901 with the arrangement of the second end portion 323 closer to a horizontal plane on which the armrest 901 is located than the first end portion 322. The first and second shafts 311, 331 are correspondingly inclined with respect to the horizontal plane in a manner of alienating from each other, and the first and second mount bodies 312, 332 are substantially vertical to the horizontal plane. The height of the first mount body 312 from the casing 32 is larger than that of the second mount body 332 such that top ends of the first and second mount bodies 312, 332 are substantially at the same height level relative to the horizontal plane.

In this embodiment, the casing 32 is rotatable about the first shaft 311 together with the second connection seat 33 between an operating position where the second connection seat 33 is situated in front of the armrest 901, and a folded position where the second connection seat 33 is situated at one side of the armrest 901. One of the first and second end portions 322, 323 extends upward and forward when the casing 32 is in the operating position or in the folded position. As shown in FIG. 5, when in the operating position, the casing 32 is inclined upward relative to the armrest 901 in a forward direction from the first connection seat 31 to be in front of the armrest 901, such that the second connection seat 33 and the controller 902 are placed in front of the armrest 901 and the operating lever 903 is disposed above the armrest 901.

Figure 6:
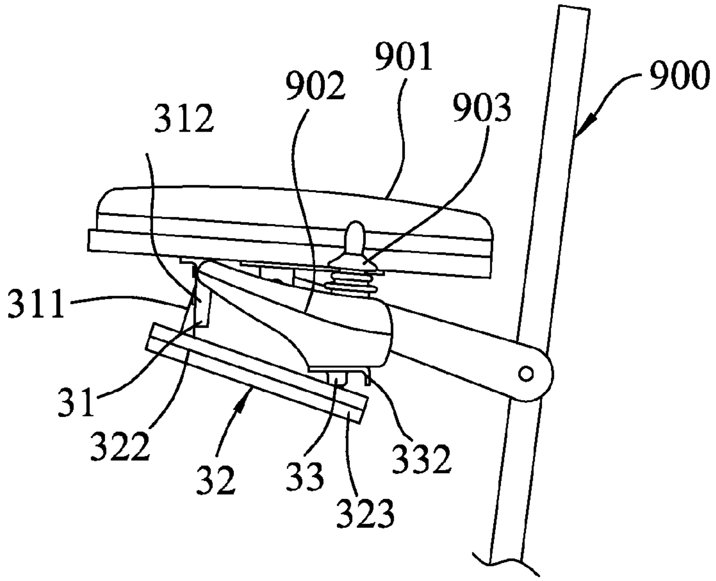
FIG. 6 is a fragmentary schematic side view similar to FIG. 5, illustrating the casing in a folded position.

As shown in FIG. 6, when the casing 32 rotates rearward from the operating position to the folded position, the second end portion 323 revolves downward and rearward about the first shaft 311 to descend a top end of the second connection seat 33 to a level lower than a top end of the first mount body 312. The second connection seat 33 is rearward of the first connection seat 31 and the controller 902 brought along to be behind the first connection seat 31. Thereby, the controller 902 is placed below the armrest 901. Specifically, because the top end portion of the first shaft 311 is inclined rearward and upward relative to the armrest 901, when the casing 32 is in the folded position, the second end portion 323 is inclined downward and rearward relative to the armrest 901 from the first connection seat 31 so that the controller 902 is brought to one side of the armrest 901. Accordingly, the controller 902 in its entirety is lower than the armrest 901. As such, the operating lever 903 is disposed below the armrest 901.

Figure 2:
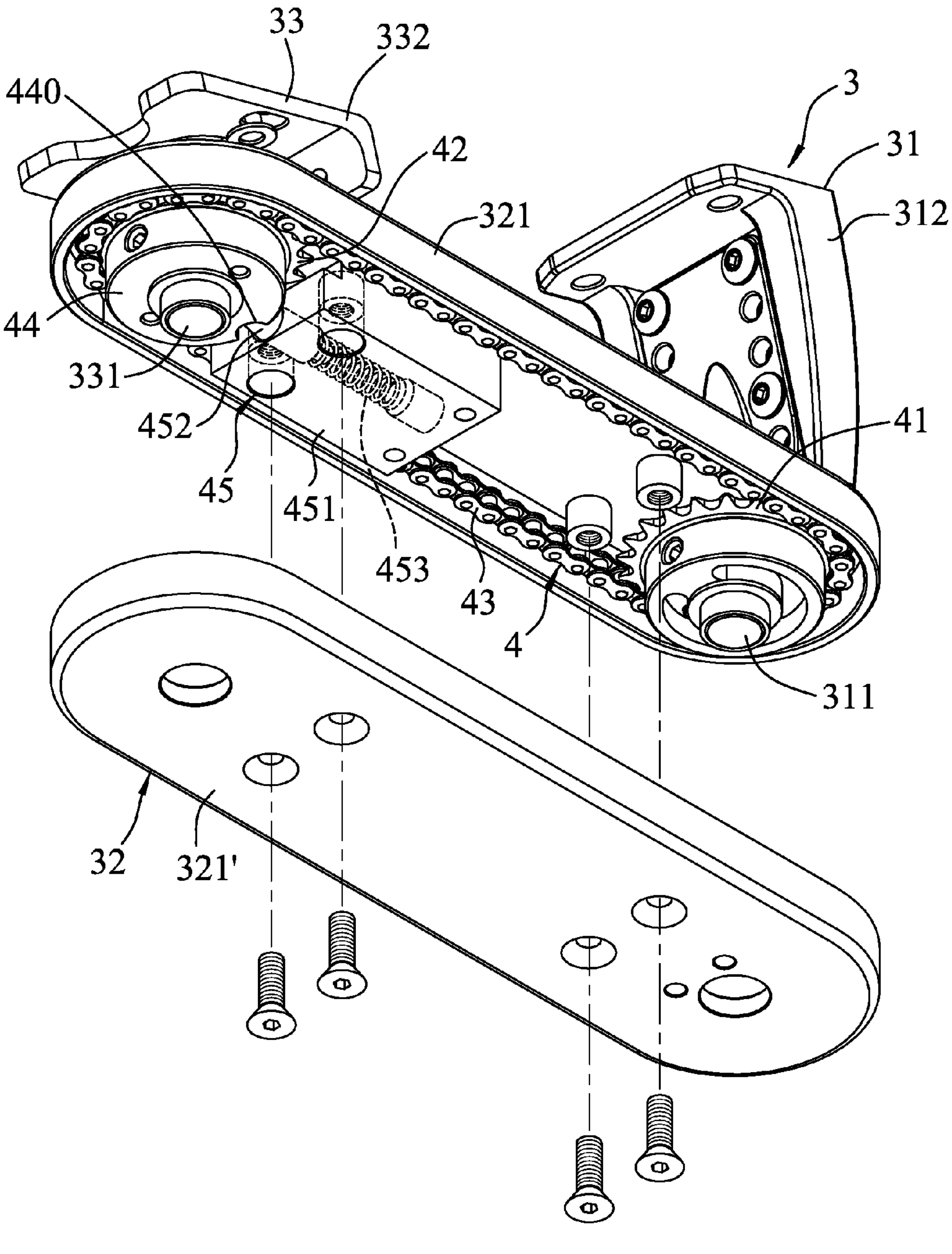
FIG. 2 is a partly exploded perspective view illustrating a casing of an adjustment mechanism of the controller shifting device.
Figure 3:
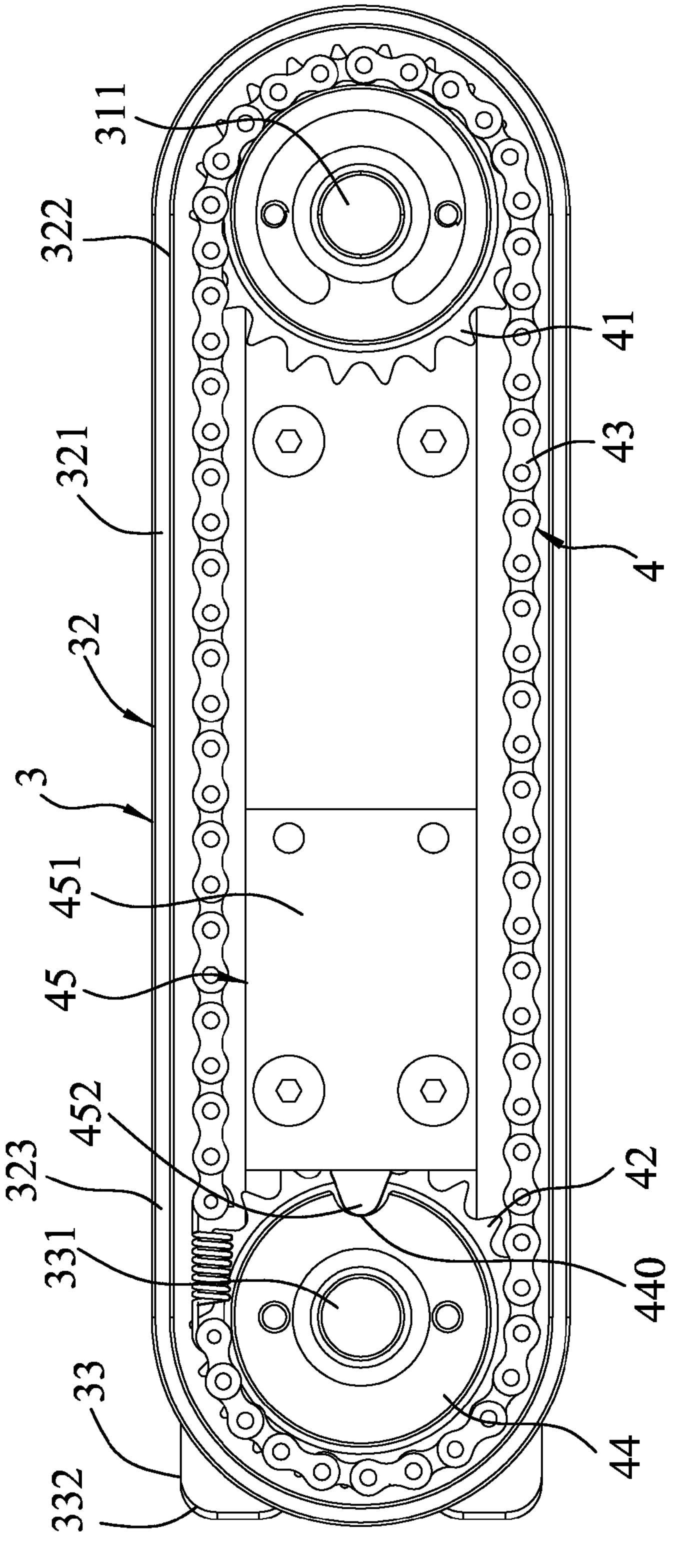
FIG. 3 is a bottom view illustrating a transmission mechanism and the adjustment mechanism of the controller shifting device where a lower cover of the casing is omitted.

With reference to FIGS. 2 to 4, the transmission mechanism 4 is mounted inside the casing 32 between the first and second shafts 311, 331. In this disclosure, the transmission mechanism 4 includes a first gear 41 that is coaxially and rotatably connected to the first shaft 311, a second gear 42 that is coaxially secured to the second shaft 331, and a transmission member 43 that extends around and meshes with the first gear 41 and the second gear 42. Specifically, the transmission mechanism 4 further includes a positioning member 44 that is disposed around and secured to the second shaft 331, and an engagement unit 45 that is mounted inside the casing 32 and that is releasably engaged with and immobilizes the positioning member 44 for positioning the casing 32 when the casing 32 is in the operating position.

In this embodiment, the transmission member 43 is exemplified by a drive chain. However, in actual implementation, the transmission member 43 may be, for instance, a gear unit that is transmissively meshed with the first gear 41 and the second gear 42, or a mechanical power transmission component. It should be noted that the structure and shape of the transmission member 43 is not limited to this disclosure.

With reference to FIGS. 3, 5 and 6, with the provision of a transmission structure, which involves the first and second gears 41, 42 and the transmission member 43, coupled to the first and second shafts 311, 331, when the casing 32 is rotated about the first shaft 311 between the folded position and the operating position, the transmission mechanism 4 is driven by rotation of the casing 32 to actuate relative rotation between the second connection seat 33 and the casing 32 for maintaining an original forward orientation of the controller 902. Since the first shaft 311 is immobilized, the transmission member 43 is driven by rotation of the casing 32 to rotate and simultaneously drive rotation of the second gear 42, along with the second shaft 331, relative to the first shaft 311, such that the second shaft 331 is rotated relative to the casing 32. With the controller 902 secured to the second connection seat 33, the controller 902 is brought by the second connection seat 33 to simultaneously rotate relative to the casing 32 for maintaining the original forward orientation of the controller 902.

In this embodiment, the positioning member 44 is provided with a notch 440 on a periphery thereof. The engagement unit 45 includes a base seat 451 that is mounted fixedly inside the casing 32, an engagement protrusion 452 that is movably mounted inside, and a resilient member 453 that is mounted inside the base seat 451 and that urges the engagement protrusion 452 to protrude outwardly of the base seat 451 to releasably engage the notch 440. Preferably, the engagement protrusion 452 has a cone shape, and is provided with a cone tip portion tapered in a direction out from the base seat 451 to extend into the notch 440.

In this embodiment, when the casing 32 is in the operating position, the notch 440 of the positioning member 44 faces the engagement unit 45, and thus, the cone tip portion of the engagement protrusion 452 of the engagement unit 45 is partially inserted into and positioned in the notch 440. Accordingly, when the powered wheelchair 900 is in use, the controller 902 is securely positioned in front of the armrest 901 to prevent wobbling thereof.

When the casing 32 is required to be rotated from the operating position to the folded position, only a slight force is required to act on the second end portion 323 of the casing 32, such that the positioning member 44 is caused to push the cone tip portion of the engagement protrusion 452, thereby retracting the engagement protrusion 452 into the base seat 451. Accordingly, the engagement protrusion 452 is released from the notch 440 of the positioning member 44, and the second connection seat 33 is rotatable relative to the casing 32. Since the first shaft 311 is perpendicular to the first end portion 322 and is obliquely connected to the armrest 901, the second end portion 323 is lower than the first end portion 322 when the casing 32 is in the operating position. As the engagement protrusion 452 is released from the notch 440 of the positioning member 44, the second connection seat 33 and the controller 902 have a tendency to rotate together with the second end portion 323 of the casing 32 about the first shaft 311 to the one side of the armrest 901 due to gravity action. As such, the second connection seat 33 revolves at the one side of the armrest 901 in a descending manner relative to the first connection seat 31 to eventually bring the controller 902 to be lower than the armrest 901. That is to say, when the casing 32 is rotated about the first shaft 311 between the folded position and the operating position, the transmission mechanism 4 is driven by the rotation of the casing 32 to actuate relative rotation between the second connection seat 33 and the casing 32 for maintaining the constant forward orientation of the controller 902 to prevent confusing steering directions that would otherwise be caused if the orientation of the controller 902 changes with the changing of the position of the casing 32.

In this embodiment, by the engagement protrusion 452 resiliently and releasably inserted into the notch 440 of the positioning member 44, the engagement unit 45 is releasably engaged with and immobilizes the positioning member 44 so as to position the casing 32 in the operating position relative to the first connection seat 31. Since arrangements of the releasable engagement between the engagement unit 45 and the positioning member 44 may vary, the positioning structure between the engagement unit 45 and the positioning member 44 is not limited to this disclosure.

To sum up, by virtue of an oblique arrangement of the first shaft 311 and the second mount body 332, after the first connection seat 31 is connected to the armrest 901, the casing 32 remains oblique relative to the armrest 901 regardless of whether the casing 32 is in the operating or in the folded position. When rotating the casing 32 to the folded position, the second connection seat 33 is driven to rotate, bringing together the controller 902, relative to the casing 32. When the casing 32 is in the folded position, since the controller 902 is entirely lower than the armrest 901, a user is prevented from inadvertently contacting the operating lever 903 of the controller 902, thereby enhancing safety of the powered wheelchair 900 in use. Furthermore, by virtue of cooperation between the positioning member 44 and the engagement unit 45, the controller 902 is securely positioned in front of the armrest 901 to prevent wobbling thereof relative to the armrest 901 when the casing 32 is in the operating position. In addition, by virtue of the transmission mechanism 4 to actuate relative rotation between the second connection seat 33 and the casing 32, the constant forward-pointing orientation of the controller 902 is remained when the casing 32 is rotated to the folded position, thereby enhancing convenient operation of the controller 902.

While the present disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A controller shifting device for interconnecting an armrest and a controller of a powered wheelchair, said controller shifting device comprising:

an adjustment mechanism including a first connection seat that is adapted to be secured to a bottom side of the armrest, a casing that has two opposite first and second end portions and that is connected pivotally to said first connection seat in an inclined manner relative to the armrest, and a second connection seat that is connected to said second end portion for installation of the controller, said first connection seat having a first shaft that extends upward relative to said casing from said first end portion, and a first mount body that is secured to and extends upwardly and obliquely relative to said casing from said first shaft for connection with the armrest, said casing being rotatable about said first shaft together with said second connection seat between an operating position where said second connection seat is situated in front of the armrest, and a folded position where said second connection seat is situated at one side of the armrest, one of said first and second end portions extends upward and forward relative to the armrest when said casing is in the operating position or in the folded position, wherein, when said casing rotates rearward from the operating position to the folded position, said second end portion revolves downward and rearward relative to the armrest to descend a top end of said second connection seat to a level lower than a top end of said first mount body, thereby placing the controller below the armrest.

2. The controller shifting device as claimed in claim 1, wherein said first shaft is substantially perpendicular to said first end portion, and wherein said casing is inclined upward relative to the armrest in a forward direction of the armrest when said casing is in the operating position.

3. The controller shifting device as claimed in claim 1, wherein said second connection seat has a second shaft that extends upward relative to said casing from said second end portion of said casing and that is substantially parallel with said first shaft, and a second mount body that is secured to said second shaft for installation of the controller.

4. The controller shifting device as claimed in claim 3, wherein said second mount body extends upwardly and obliquely relative to said casing from said second shaft.

5. The controller shifting device as claimed in claim 3, further comprising a transmission mechanism that is mounted inside said casing between said first and second shafts, wherein, when said casing is rotated about said first shaft and between the folded position and the operating position, said transmission mechanism is driven by rotation of said casing to actuate relative rotation between said second connection seat and said casing for maintaining an original forward orientation of the controller.

6. The controller shifting device as claimed in claim 5, wherein said transmission mechanism includes a first gear that is coaxially and rotatably connected to said first shaft, a second gear that is coaxially secured to said second shaft, and a transmission member that extends around and meshes with said first gear and said second gear.

7. The controller shifting device as claimed in claim 6, wherein said transmission member is a drive chain.

8. The controller shifting device as claimed in claim 6, wherein said transmission mechanism further includes a positioning member that is disposed around and secured to said second shaft, and an engagement unit that is mounted inside said casing and that is releasably engaged with and immobilizes said positioning member for positioning said casing when said casing is in the operating position.

9. The controller shifting device as claimed in claim 8, wherein said positioning member is provided with a notch on a periphery thereof, said engagement unit including a base seat that is mounted fixedly inside said casing, an engagement protrusion that is movably mounted inside said base seat, and a resilient member that is mounted inside said base seat and that urges said engagement protrusion to protrude outwardly of said base seat to releasably engage said notch.

* * * * *